US011077757B2

(12) United States Patent
Park

(10) Patent No.: US 11,077,757 B2
(45) Date of Patent: Aug. 3, 2021

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventor: Song Il Park, Seongnam-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 49 days.

(21) Appl. No.: 16/212,315

(22) Filed: Dec. 6, 2018

(65) Prior Publication Data

US 2019/0337397 A1    Nov. 7, 2019

(51) Int. Cl.
*B60L 15/20* (2006.01)
*B60L 15/08* (2006.01)
*B60L 3/10* (2006.01)
*B60L 50/51* (2019.01)

(52) U.S. Cl.
CPC ............... *B60L 15/20* (2013.01); *B60L 3/10* (2013.01); *B60L 15/08* (2013.01); *B60L 50/51* (2019.02); *B60L 2240/465* (2013.01); *B60L 2260/24* (2013.01)

(58) Field of Classification Search
CPC .................. B60L 15/20; B60L 50/51
See application file for complete search history.

(56) References Cited

U.S. PATENT DOCUMENTS

| 6,338,392 B1 * | 1/2002 | Schmitt | B60K 28/16 180/197 |
| 2016/0131250 A1 * | 5/2016 | Fan | F16H 61/16 701/52 |
| 2017/0057361 A1 * | 3/2017 | Cho | B60W 10/18 |
| 2019/0039601 A1 * | 2/2019 | Hawley | B60K 6/48 |

FOREIGN PATENT DOCUMENTS

| JP | 201262113 | * | 8/2012 |
| KR | 20090047249 | * | 5/2009 |

OTHER PUBLICATIONS

JP201262113 Machine translation, Kawabata Naoto, Aug. 30, 2012.*
KR20090047249 machine translation, Choi Hae Ryong, May 12, 2009.*

* cited by examiner

*Primary Examiner* — Anne Marie Antonucci
*Assistant Examiner* — Abdalla A Khaled
(74) *Attorney, Agent, or Firm* — Morgan, Lewis & Bockius LLP

(57) ABSTRACT

A vehicle includes: a plurality of wheels; a motor for providing a driving force to the plurality of wheels based on electrical energy stored in a battery; a modulator for controlling a number of rotations of the motor; and a controller for controlling the modulator based on a first control value at a coasting control and controlling the modulator based on a second control value when a wheel slip occurs in a safety control.

18 Claims, 12 Drawing Sheets

-PRIOR ART-

−PRIOR ART−

VEHICLE AND CONTROL METHOD THEREOF

CROSS-REFERENCE TO RELATED APPLICATION(S)

This application is based on and claims priority under 35 U.S.C. § 119 to Korean Patent Application No. 10-2018-0051049, filed on May 3, 2018 in the Korean Intellectual Property Office, the disclosure of which is incorporated by reference herein in its entirety.

TECHNICAL FIELD

The present disclosure relates to an electric vehicle that uses a motor as a power source and a control method thereof.

BACKGROUND

A vehicle can be classified into an internal combustion engine vehicle, a hybrid electric vehicle, and a pure electric vehicle according to the form of a power source generating driving force.

The internal combustion engine vehicle burns fossil fuels to generate power. In order to solve the exhaustion problem of fossil fuels used as fuel for internal combustion engine vehicles and environmental pollution problems, hybrid electric vehicles and pure electric vehicles have been developed and the penetration rate is gradually increasing.

The hybrid electric vehicle can be further classified into two different types as described below.

The hybrid electric vehicle of a first type includes both a motor and an internal combustion engine, and drives the motor by charging a battery using the driving force of the internal combustion engine or the regenerative energy generated during braking. That is, the hybrid electric vehicle of the first type charges the battery with power generated internally without being supplied with electric power from the outside.

The hybrid electric vehicle of a second type includes both a motor and an internal combustion engine, which is the same as the first type, but further includes a means for being supplied with electric power from the outside to charge a battery. That is, the hybrid electric vehicle of the second type can be supplied with electric power from the outside in a plug-in manner to charge the battery. This form is a plug-in hybrid vehicle (PHEV).

Pure electric vehicles of plural types have also been developed and spreading.

A hydrogen electric vehicle is a type in which a motor is driven by charging a battery by electricity generated when a chemical reaction of hydrogen and oxygen occurs. Since the hydrogen electric vehicle uses hydrogen as fuel to produce electricity and drive the motor, power is not supplied from the outside to charge the battery.

Another type of pure electric vehicle includes only a battery and a motor without using fuel such as hydrogen, and is supplied with electric power from the outside to charge the battery to drive the motor. This type is the aforementioned plug-in hybrid vehicle (PHEV).

On the other hand, hybrid electric vehicles and pure electric vehicles use motors that convert electricity to a driving force. Hereinafter, hybrid electric vehicles and pure electric vehicles employing motors as driving devices are all referred to as vehicles.

SUMMARY

It is an aspect of the present disclosure to provide a vehicle and a control method thereof capable of improving driving stability on low friction road surfaces by variably controlling a coasting torque when a wheel slip occurs during driving.

It is another aspect of the present disclosure to provide a vehicle and a control method thereof capable of improving the fuel efficiency by decelerating the vehicle while avoiding the loss due to the braking of a hydraulic brake.

Additional aspects of the present disclosure will be set forth in part in the description which follows and, in part, will be obvious from the description, or may be learned by practice of the disclosure.

In accordance with one aspect of the present disclosure, a vehicle comprises: a plurality of wheels; a motor for providing a driving force to the plurality of wheels based on electrical energy stored in a battery; a modulator for controlling a number of rotations of the motor; and a controller for controlling the modulator based on a first control value at a coasting control and controlling the modulator based on a second control value when a wheel slip occurs in a safety control.

The controller may control the modulator so that the second control value is smaller than the first control value.

The controller may calculate a modulation value through a pulse width modulation (PWM) method based on at least one of the first control value or the second control value.

The controller may control the modulator with a second modulation value calculated based on the second control value, and then control the modulator again by increasing the second control value if the wheel slip dissipates.

The vehicle may further comprise a paddle shifter for receiving an input command from a driver, wherein the controller may determine the first control value based on the input command transmitted by the paddle shifter.

The controller may determine the wheel slip if the difference in the rotational speed of the plurality of wheels provided in the vehicle is a preset time or more.

The vehicle may further comprise: a sensor provided in the vehicle; and a communication device for communicating with the outside, wherein the controller may determine the safety control based on the state of a road surface transmitted from at least one of the sensor and the communication device.

The controller may release the safety control if the increased second control value is equal to the first control value.

The controller may vary the second control value again if the wheel slip occurs during the increase of the second control value.

The controller may determine an increase amount of the second control value based on a preset time.

In accordance with another aspect of the present disclosure, a control method of a vehicle, which includes a motor for providing a driving force to wheels based on electrical energy stored in a battery, comprises: determining, by a controller, a safety control based on a state of a road surface; controlling, by the controller, the motor based on a first control value at a coasting control; and controlling, by the controller, the motor based on a second control value when a wheel slip occurs in the safety control.

Controlling the motor may comprise: controlling the motor so that the second control value is smaller than the first control value.

Controlling the motor may comprise: calculating a modulation value through a pulse width modulation (PWM) method based on at least one of the first control value or the second control value; and controlling the number of rotations of the motor based on the calculated modulation value.

Controlling the motor may comprise: controlling the motor with a second modulation value calculated based on the second control value, and then controlling the motor again by increasing the second control value if the wheel slip dissipates.

The vehicle may further comprise: a paddle shifter for receiving an input command from the driver, wherein controlling the motor may comprise: determining the first control value based on an input command transmitted by the paddle shifter.

The control method may further comprise: determining the wheel slip if the difference in the rotational speed of the plurality of wheels provided in the vehicle is a preset time or more.

The vehicle may further comprise: a sensor provided in the vehicle; and a communication device for communicating with the outside, wherein determining the safety control: comprises determining the safety control based on the state of a road surface transmitted from at least one of the sensor and the communication device.

Controlling the motor may comprise: releasing the safety control and executing the coasting control if the increased second control value is equal to the first control value.

Controlling the motor may comprise: varying the second control value again if the wheel slip occurs during the increase of the second control value.

Controlling the motor may comprise: determining an increase amount of the second control value based on a preset time.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
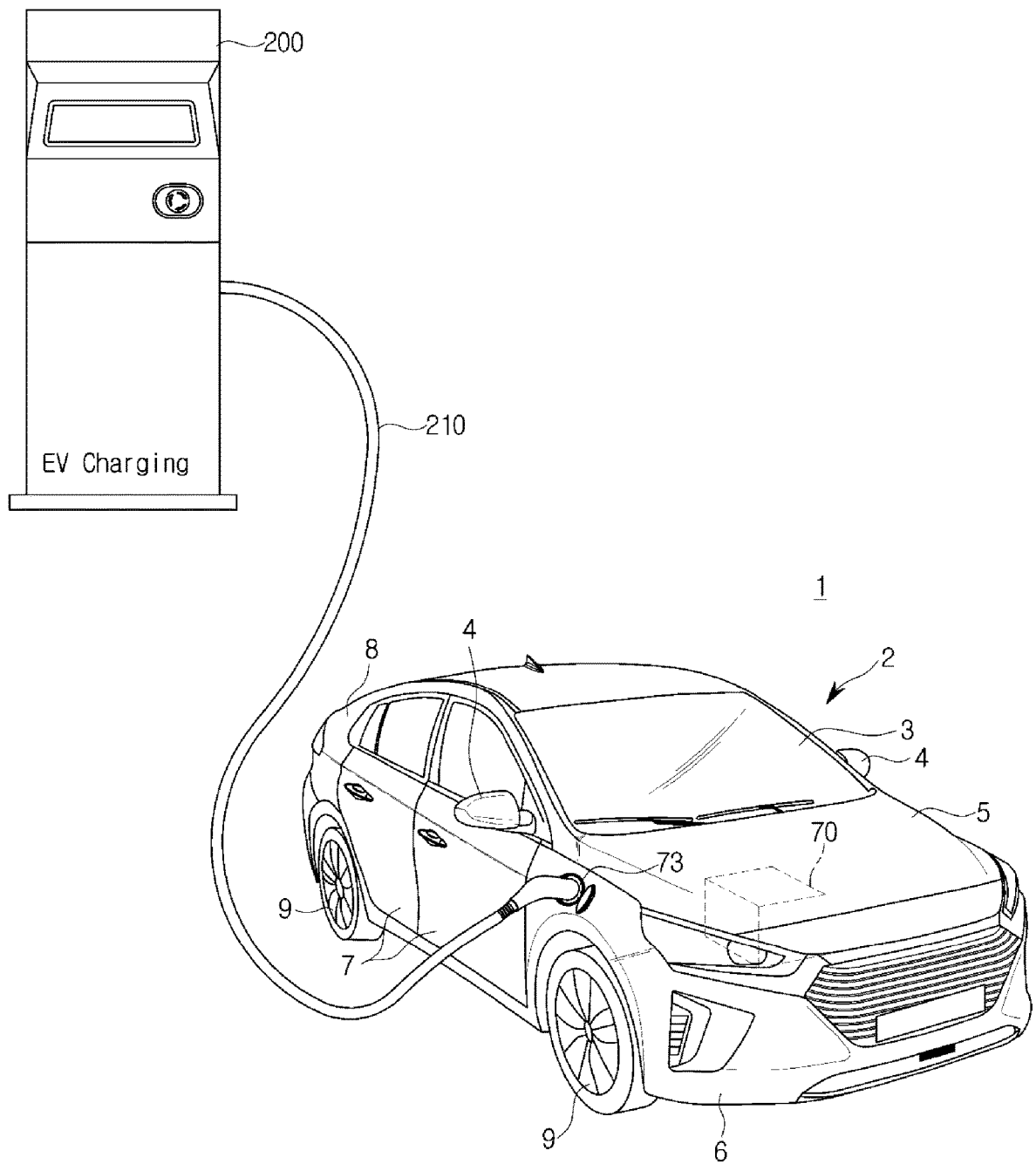
FIG. 1 is a view illustrating a vehicle according to an embodiment of the present disclosure.

Like reference numerals refer to like elements throughout the specification. This specification does not describe all the elements of the embodiments, and duplicative contents between general contents or embodiments in the technical field of the present invention will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification sign is used for convenience of explanation, and the identification sign does not describe the order of each step, and each step may be performed differently from the sequence specified unless explicitly stated in the context of the particular sequence.

Hereinafter, the working principle and embodiments of the present disclosure will be described with reference to the accompanying drawings.

FIG. 1 is a view illustrating a vehicle according to an embodiment of the present disclosure.

Referring to FIG. 1, a vehicle 1 includes a vehicle body 2 forming an outer appearance of the vehicle 1, a front window 3 or side windows 4 provided together with the vehicle body 2, and wheels 9 for moving the vehicle body 2.

The vehicle body 2 may be divided into a hood 5, a front fender 6, doors 7, and a luggage compartment lid 8.

Various wind shields may be provided in a front portion of the vehicle body 2, such as the front window 3 for providing a front view to a driver, and the side windows 4 for providing a side view and a rear view.

The wheels 9 may be divided into front wheels and rear wheels, and are rotated by receiving power from a driving motor (hereinafter referred to as the motor) 70. In the vehicle 1, the motor 70 converts the electrical energy transmitted by a battery (not shown) into kinetic energy for rotating the wheels 9. The power source of the disclosed vehicle 1 may be electrical energy stored by the battery. The battery receives electricity from a charger 200 outside the vehicle body 2 as shown in FIG. 1.

The charger 200 may be connected to a charging port 73 provided at one side of the front fender 6 of the vehicle body 2 through a connector 210 to charge the battery.

Figure 2:
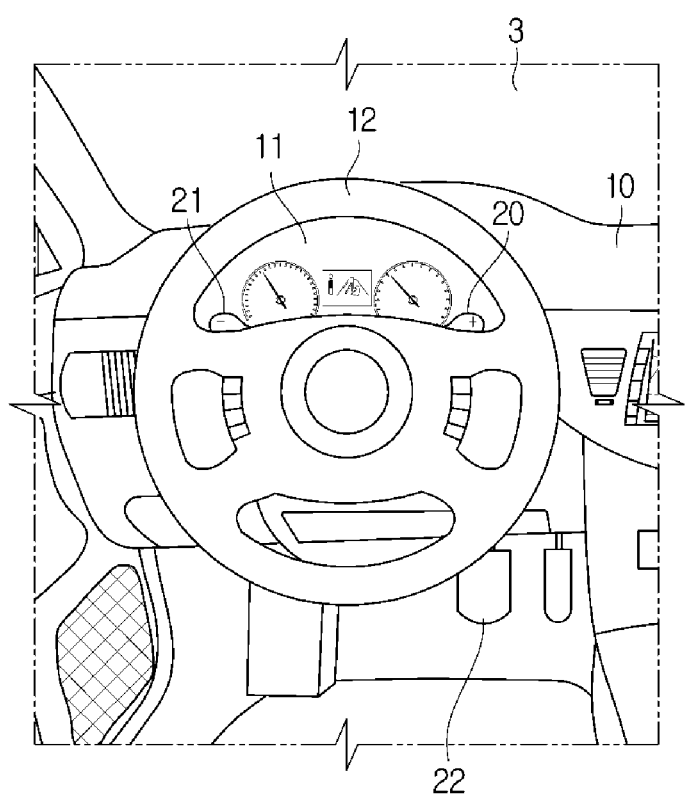
FIG. 2 is a view illustrating a part of the inside of the vehicle.
Figure 3:
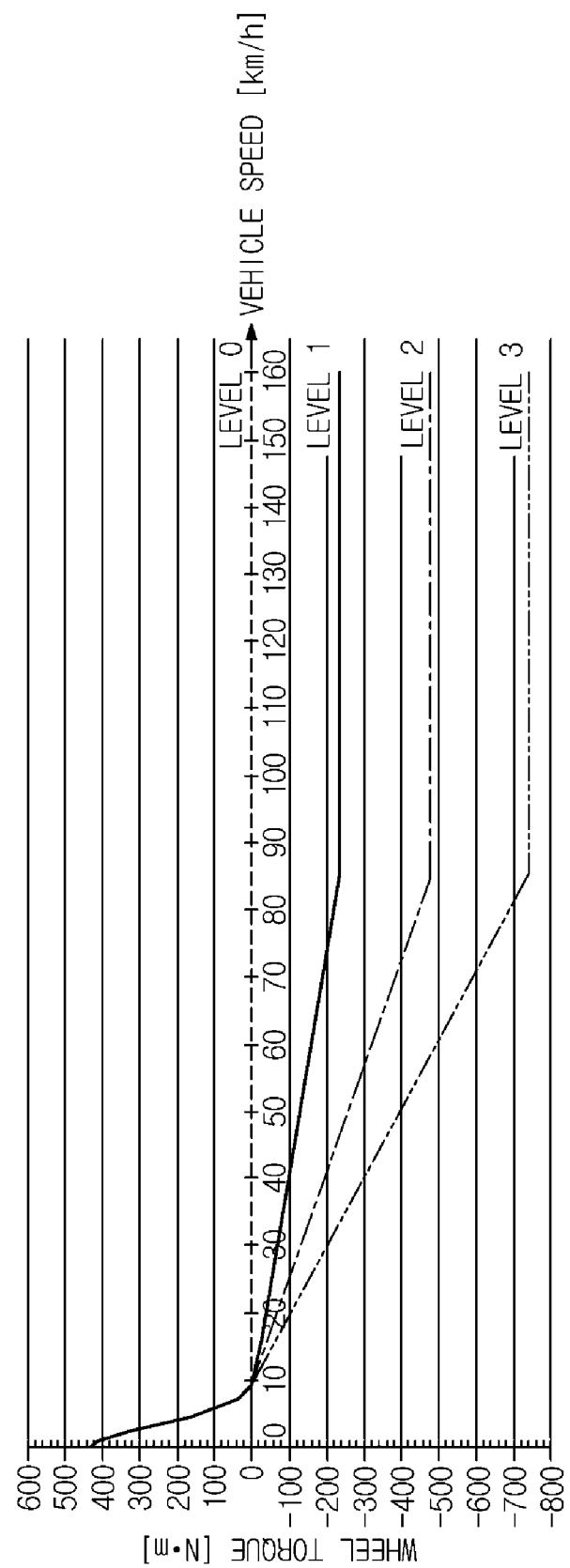
FIG. 3 is a graph for explaining a coasting control.

FIG. 2 is a view illustrating a part of the inside of the vehicle 1, and FIG. 3 is a graph for explaining a coasting control. In FIG. 3, the X-axis represents the vehicle speed (Km/h) and the Y-axis represents the torque (Nm).

Referring to FIG. 2, a steering wheel 12, a cluster 11 that is provided toward the front of the vehicle body 2 from the steering wheel 12 and displays operation information of the vehicle 1, and a dashboard 10 connected to the cluster 11 and equipped with various devices for operating the vehicle 1 may be provided in the vicinity of the seat in which the driver is seated in the vehicle 1.

Specifically, the dashboard 10 is provided to protrude from a lower portion of the front window 3 toward the seat so that the driver can operate various devices installed on the dashboard 10 while looking forward.

For example, the various devices provided on the dashboard 10 may include an AVN (Audio Video Navigation) device or ventilation ports connected to an air conditioner and various input/output devices in a center fascia, which is a central area of the dashboard 10.

The cluster 11 displays the current state and operation information for controlling the vehicle 1 by a controller 50 (see FIG. 6), and various display devices may be provided for this purpose. For example, when the driver depresses a brake pedal 22, the controller 50 controls the motor 70 to reduce the number of rotations of the wheels 9 and outputs the current speed of the vehicle 1 through the cluster 11. The steering wheel 12 may control the direction of the wheels 9 and may include a plurality of buttons that allow the driver to conveniently transmit various input commands while driving. The disclosed steering wheel 12 may be provided with paddle shifters 20 and 21 toward the cluster 11.

The paddle shifters 20 and 21 serve to transmit an input command to the controller 50, which allows the driver to control a coasting torque or a creep torque.

Generally, the coasting torque means a torque outputted to the wheels through an engine and a transmission of a vehicle in a state in which an acceleration pedal or a deceleration pedal (the brake pedal 22) is not depressed (hereinafter referred to as coasting control). In a vehicle equipped with an internal combustion engine, the coasting torque is controlled according to the characteristics of a fuel cut control of the engine or a converter control of the automatic transmission.

In the disclosed vehicle 1 in which the engine is not provided and the motor 70 is used as a power source, an intermediate coasting torque becomes zero in the coasting control. However, the disclosed vehicle 1 virtually generates a coasting torque in consideration of the fuel efficiency as shown in FIG. 3, while giving a driver a driving feeling similar to that of a vehicle to which the internal combustion engine is applied.

That is, the vehicle 1 generates a coasting torque based on a preset vehicle speed (10 Km/h in FIG. 3). For example, the vehicle 1 generates a coasting torque of 0 to 400 Nm, even if the driver does not step on the accelerator pedal when the current running speed (vehicle speed) is less than 10 Km. Herein, the + sign is the acceleration direction. However, when the vehicle speed is 10 Km/h or more, the vehicle 1 may generate a preset torque in the deceleration direction.

The driver may control the magnitude of the coasting torque through the disclosed paddle shifters 20 and 21.

Referring again to FIG. 3, the disclosed vehicle 1 may regulate a level of the running torque through the paddle shifters 20 and 21. Based on the regulated level, the vehicle 1 may separately generate a coasting torque to level 1 to level 3 in the deceleration direction at the preset vehicle speed or more, and each level includes a preset control value.

Specifically, when the vehicle speed is 10 km/h or less, level 0 (zero) maintains the coasting torque at 0 Nm to eliminate the load acting on the vehicle 1 by a powertrain. This allows the vehicle 1 to travel a great distance during the coasting control. As the driver increases the level through the right paddle shifter 20, the magnitude of the regenerative braking torque of the motor 70 increases. The higher the level, the stronger the braking force can be applied to the vehicle 1.

If the coasting torque is over the predetermined value, there is a problem in the running stability. Therefore, the disclosed vehicle 1 may limit the maximum magnitude of the coasting torque generated for each level as shown in FIG. 3.

On the other hand, each level of the coasting torque transmitted by the paddle shifters 20 and 21 based on the driver's operation may vary, and the limited maximum torque value is also not limited to the graph of FIG. 3.

Figure 4:
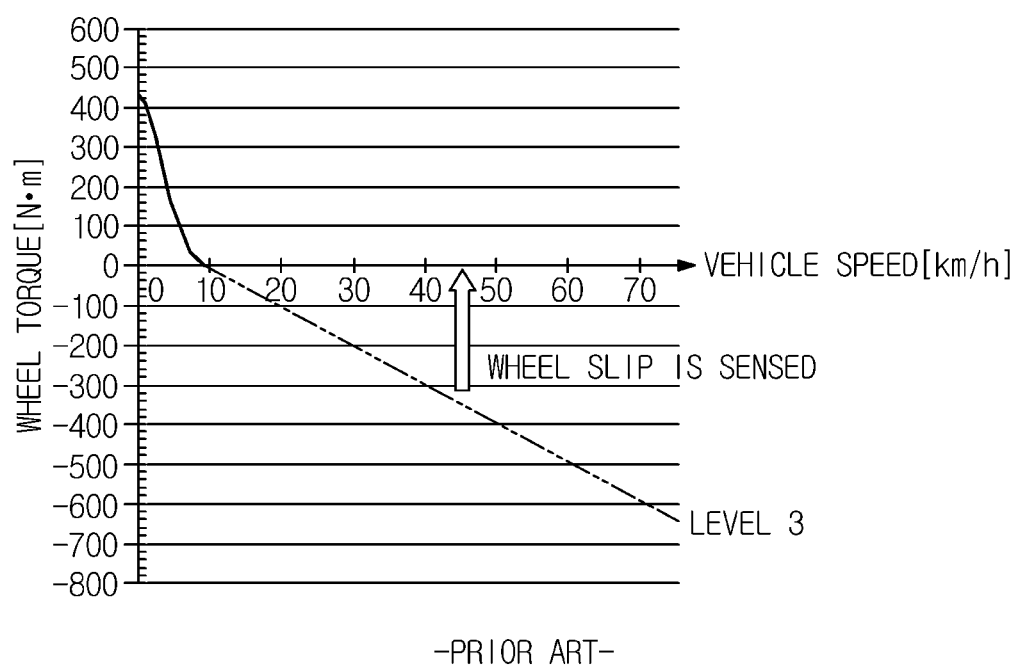
FIGS. 4 and 5 are views for explaining problems according to the prior art.
Figure 5:
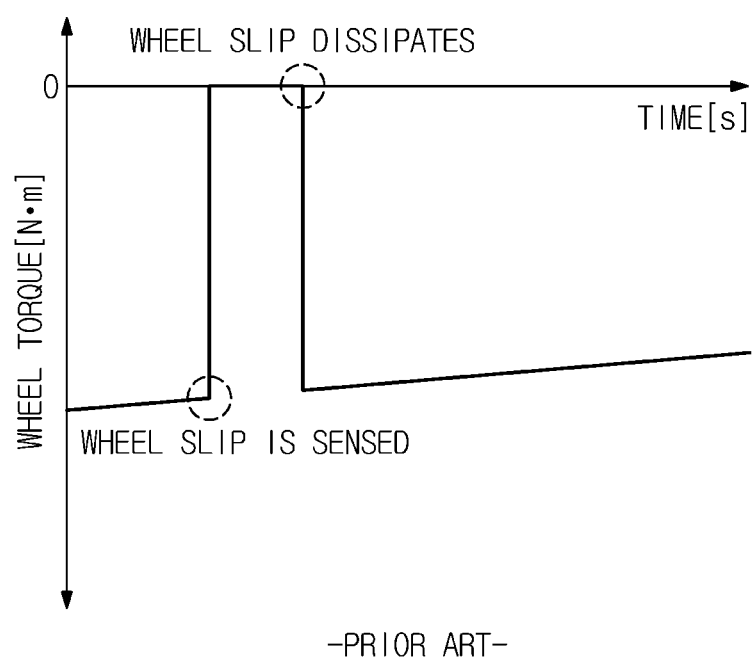

FIGS. 4 and 5 are views for explaining problems according to the prior art. In FIG. 5, the X-axis represents time and the Y-axis represents torque (Nm).

A wheel slip may occur when driving on a low friction road surface, such as an icy road or an underground parking lot flooded with water. Herein, the wheel slip means a slip slide phenomenon in which the wheels slip off the road surface, and occurs when the braking force is greater than the friction force between the road surface and the wheels.

As shown in FIG. 4, the wheel slip may also occur in the vehicle 1 under the coasting control. Further, the greater the level input by the paddle shifter 20, the stronger the coasting torque acts as the braking force, and thus there may be a problem in stability.

Further, the coasting does not meet the operating condition of the anti-lock brake system (ABS) because the driver does not step on the brake pedal 22. Accordingly, if wheel slip occurs in the wheels 9 in which a strong torque is generated, the risk of an accident is high.

In order to solve this problem, a general vehicle employing a conventional motor simply changes the coasting torque to zero when the wheel slip is sensed as shown in FIG. 5. Further, when the wheel slip dissipates, the conventional vehicle changes the coasting torque to the torque before the wheel slip occurs, and naturally reduces the magnitude of the coasting torque with the vehicle deceleration over time.

However, if the coasting torque is simply changed to 0 as in the conventional vehicle, the feeling of braking of the vehicle disappears at the point of start of control, and the drivability may be deteriorated. Further, if the wheel slip dissipates and generates a coasting torque again, there arises a problem that the drivability is deteriorated due to the feeling of sudden braking.

Figure 6:
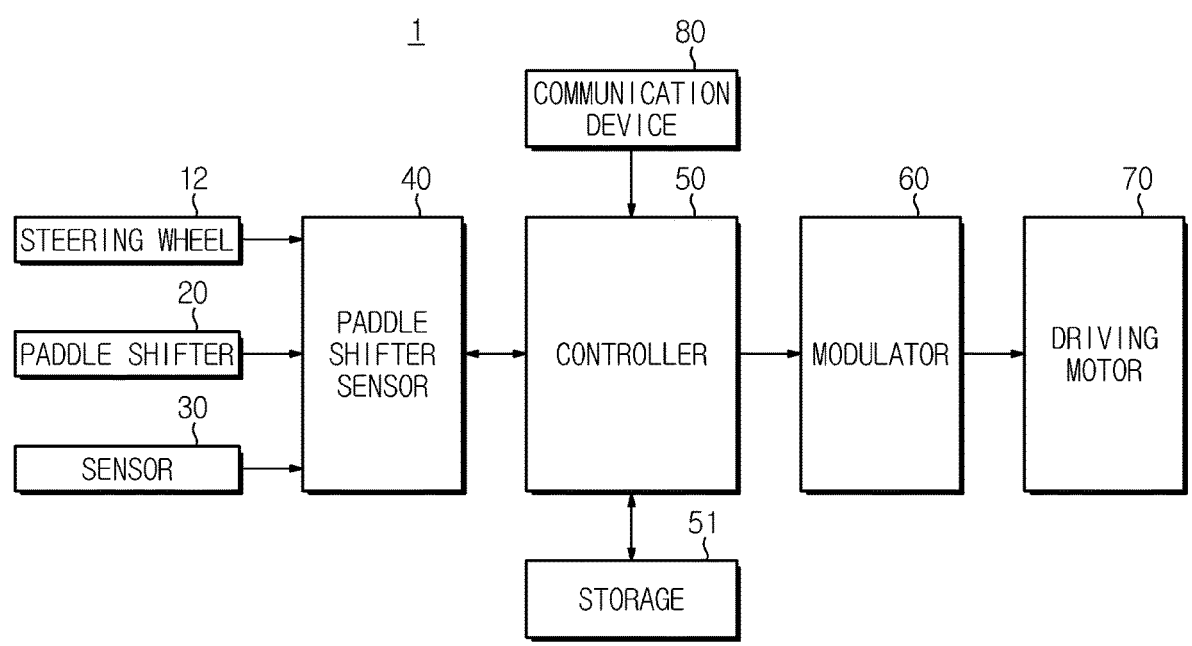
FIG. 6 is a control block diagram of a vehicle according to an embodiment of the present disclosure.

FIG. 6 is a control block diagram of a vehicle according to an embodiment of the present disclosure. The description of the same components as those shown in the previous drawings will be omitted.

Referring to FIG. 6, the vehicle 1 includes a wheel sensor 30 for collecting information on the state of the road surface and rotational speed information of the wheels 9, the steering wheel 12, a paddle shifter sensor 40 for collecting information and an input command transmitted from the paddle shifter 20 and the sensor 30, the controller 50 for controlling the overall operation of the vehicle 1, a storage 51 for storing the collected data, the motor 70, a modulator 60 for performing PWM (Pulse Width Modulation) to control the number of rotations of the motor 70, and a communication device 80 for receiving information on the road surface state from the outside of the vehicle 1.

Specifically, the sensor 30 may be provided in the vehicle 1 to collect various information. For example, the sensor 30 may be provided around the wheels 9 to collect rotational speed information and collect information on the road surface state on which the vehicle 1 travels.

The paddle shifter sensor 40 determines whether or not the vehicle 1 is presently traveling through the steering wheel 12 or the brake pedal 22 or the like.

For example, when the driver does not step on the acceleration or deceleration pedal while operating the automatic gear at a D-stage, the paddle shifter sensor 40 may determine that the vehicle is in the coasting control state.

Further, the paddle shifter sensor 40 may receive the stage of the coasting control inputted by the driver through the paddle shifter 20 and transmit an input command to the controller 50.

The paddle shifter sensor 40 may sense whether or not a wheel slip has occurred from the steering wheel 12 and the sensor 30.

Specifically, the paddle shifter sensor 40 senses the rotational speed difference between the front wheels 9 and the rear wheels 9 provided in the vehicle 1 from the sensor 30, and transmits the sensed result to the controller 50. The controller 50 determines that the wheel slip occurs if the rotational speed difference between the wheels 9 continues for a predetermined time or more stored in the storage 51.

Further, the paddle shifter sensor 40 may further sense the steering angle or Yaw angle of the steering wheel 12 to increase the accuracy of the wheel slip determination and transmit the sensed steering angle to the controller 50.

In addition to the configuration shown in FIG. 6, the paddle shifter sensor may collect information from each component of the vehicle 1 and transmit it to the controller 50. In addition, the paddle shifter sensor 40 may be connected to each component via a CAN (Control Area Network) or a LIN (Local Interconnect Network) provided in the vehicle 1.

The modulator 60 is an inverter for controlling the motor 70 and controls the rotational speed of the motor 70 by changing the frequency. The disclosed modulator 60 determines the rotational speed of the motor 70 through the modulation value calculated by the controller 50 through the PWM method.

The communication device 80 serves to receive information from the outside of the vehicle 1. For example, the communication device 80 may collect information on the road surface state on which the vehicle 1 presently travels from GPS information.

In order to perform communication with the outside, the communication device 80 may be a hardware device and include at least one of a short-range communication module, a wired communication module, and a wireless communication module.

The short-range communication module may include various short-range communication modules that transmit and receive signals using a wireless communication network in a short distance such as a Bluetooth module, an infrared communication module, an RFID (Radio Frequency Identification) communication module, a WLAN (Wireless Local Access Network) communication module, an NFC communication module, and a Zigbee communication module.

The wired communication module may include various cable communication modules such as a USB (Universal Serial Bus), an HDMI (High Definition Multimedia Interface), a DVI (Digital Visual Interface), an RS-232 (recommended standard 232), a power line communication, and a POTS (plain old telephone service).

The wireless communication module may include a wireless communication module supporting various wireless communication methods such as a GSM (Global System for Mobile Communication), a CDMA (Code Division Multiple Access), a WCDMA (Wideband Code Division Multiple Access), a UMTS (universal mobile telecommunications system), and a TDMA (Time Division Multiple Access) in addition to a Wi-Fi module and a wireless broadband module.

The controller 50 controls the motor 70 to generate a variable coasting torque based on the information collected from the paddle shifter sensor 40 and the communication device 80.

Specifically, the controller 50 determines the state of the road surface on which the vehicle 1 travels and whether the vehicle is in the wheel-slip state from the paddle shifter sensor 40 and the communication device 80, and determines whether to perform the coasting control or the safety control.

The safety control is determined according to whether or not the vehicle 1 is presently traveling on a low friction road surface, and is determined through weather information, map information, running visibility information transmitted by the sensor 30, and the like. The wheel slip is determined based on the difference in the rotational speed between the wheels 9 transmitted by the sensor 30 and the steering angle of the steering wheel 12 as described above.

The coasting control is determined when the driver operates the automatic gear to the D-stage and does not step on the acceleration or deceleration pedal at the same time, as described above with reference to the previous drawing.

When the coasting control or the safety control is determined, the controller 50 controls the modulator 60 based on a preset first control value in the coasting control. Herein, the first control value, which is an input command transmitted by the driver through the paddle shifter 20, is a signal for generating a coasting torque to the motor 70 through the modulator 60.

When the wheel slip occurs in the safety control, the controller 50 controls the modulator 60 based on a second control value smaller than the first control value. That is, when the motor 70 rotates at a torque of a predetermined magnitude based on the first control value, the motor 70 rotates at a torque smaller than the predetermined magnitude based on the second control value.

The second control value is a control signal for generating a minimum coasting torque at which the wheel slip does not occur through repeated experiments in the weight of the vehicle 1 and the state of the road surface and is stored in the storage 51. In addition, the second control value is independent of the input command by the paddle shifter 20, and may be applied when the wheel slip occurs regardless of the level.

Through this, the disclosed vehicle 1 ensures a stable running feeling and stability as compared with the prior art in which the rotational torque is simply changed to zero.

The controller 50 may be implemented with a memory (not shown) for storing an algorithm for controlling the operation of the components in the vehicle 1 or data for a program reproducing the algorithm, and a processor (not shown) that performs the above-described operation using data stored in the memory. The memory and the processor may each be implemented as separate chips. Alternatively, the memory and the processor may be implemented as a single chip.

A control method performed by the controller 50 will be described later in detail with reference to other drawings.

The storage 51 stores data collected by the paddle shifter sensor 40 or the 80 and an input command of the driver, and stores data relating to preset control values.

The storage 51 may be implemented with at least one of a nonvolatile memory device such as a cache, a ROM (read only memory), a PROM (programmable ROM), an EPROM (erasable programmable ROM), an EEPROM (electrically erasable programmable ROM), and a flash memory; a volatile memory device such as a RAM (Random Access Memory); and a storage medium such a HDD (Hard Disk Drive) and a CD-ROM, but is not limited thereto. The storage 51 may be a memory implemented as a chip separate from the above-described processor in association with the controller 50, and may be implemented as a single chip with the processor.

Each component shown in FIG. 6 refers to a software component and/or a hardware component such as a FPGA (Field Programmable Gate Array) and an ASIC (Application Specific Integrated Circuit).

At least one component may be added or deleted to or from the components of the vehicle 1 shown in FIG. 6. Further, it will be readily understood by those skilled in the art that the mutual position of the components may be changed corresponding to the performance or structure of the system.

FIGS. 7A-7H are views for explaining a safety control according to an embodiment of the present disclosure.

Figure 7A:
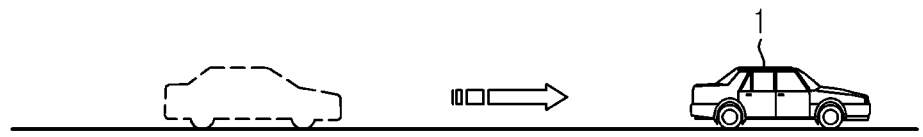
FIGS. 7A-7H are views for explaining a safety control according to an embodiment of the present disclosure.

Referring to FIG. 7A, as one example, the driver may step on the accelerator pedal and accelerate the vehicle 1. The vehicle 1 rotates the motor 70 in accordance with an input command transmitted by the driver and torque is generated in the wheels 9 according to the number of rotations of the motor 70.

Figure 7B:

When the driver releases his/her foot from the accelerator pedal or the deceleration pedal (the brake pedal 22), the vehicle 1 executes the coasting control (inertia running), as shown in FIG. 7B. In one example, the vehicle 1 receives a level determining the number of rotations of the motor 70 in the coasting control from the paddle shifters 20 and 21, and the vehicle 1 travels with a coasting torque based on the received level.

Figure 7C:
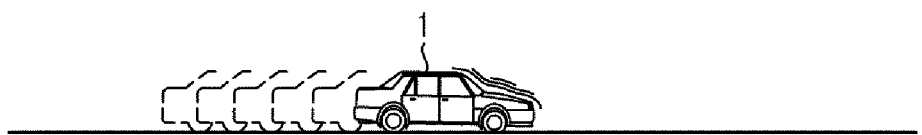

When the driver inputs a high level through the paddle shifter 20, the vehicle 1 generates a larger coasting torque in the deceleration direction and decelerates with a strong braking force, as shown in FIG. 7C.

Figure 7D:

The vehicle 1 may travel on a low friction road surface, as shown in FIG. 7D. The vehicle 1 may determine whether or not the vehicle 1 has entered the road surface where the wheel slip is likely to occur through the sensor 30 or the communication device 80.

Figure 7E:
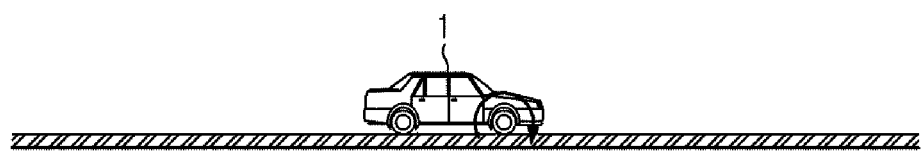

Further, the vehicle 1 determines whether a wheel slip has occurred, as shown in FIG. 7E. When the difference in rotation between the two front wheels 9 or the two rear wheels 9 provided in the vehicle 1 is maintained for a predetermined time or more, the vehicle 1 determines that the wheel slip has occurred.

Figure 7F:
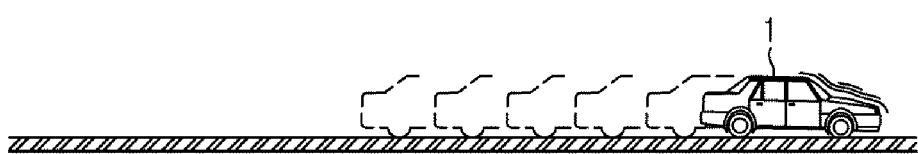

When the wheel slip occurs, the vehicle 1 restores the steering stability of the driver with the safety control, as shown in FIG. 7F. Specifically, the vehicle 1 controls the motor 70 to travel with a torque lower than a torque generated in the coasting control. Through this, the deceleration of the vehicle 1 is lower than in the coasting control, but the wheel slip may be easily overcome. Further, when the wheel slip dissipates, the vehicle 1 gradually raises the torque that has been controlled to be lower.

Figure 7G:

Through the safety control, the vehicle 1 escapes the low friction road surface, as shown in FIG. 7G.

Figure 7H:
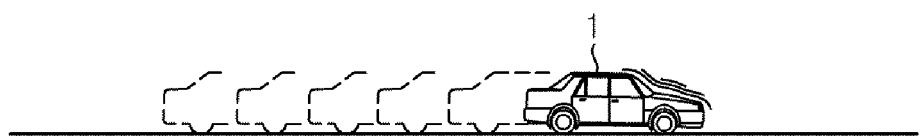

When it is determined that the vehicle 1 has escaped from the low friction road surface, the vehicle 1 releases the safety control and performs the coasting control based on the input command by the paddle shifters 20 and 21, as shown in FIG. 7H.

Figure 8A:
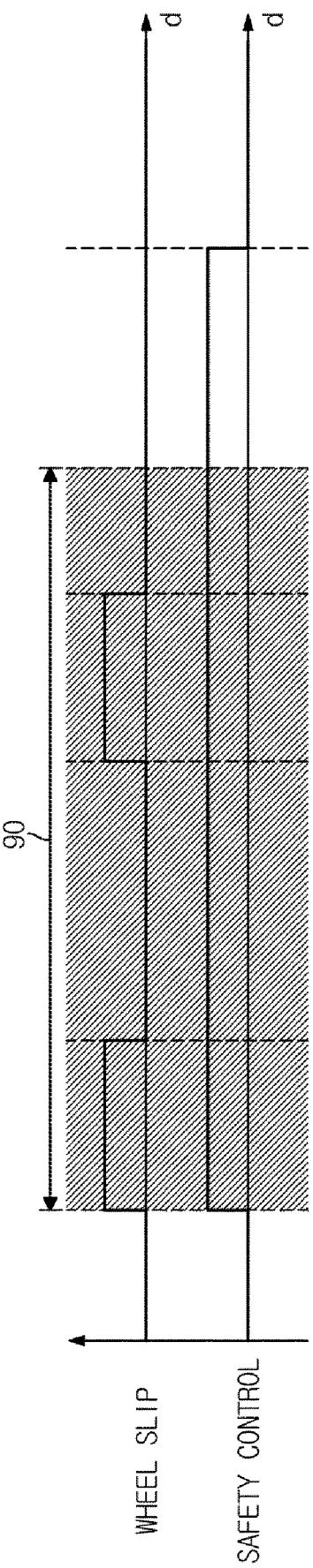
FIGS. 8A-8C are graphs for explaining the safety control according to an embodiment of the present disclosure in detail.
Figure 8B:
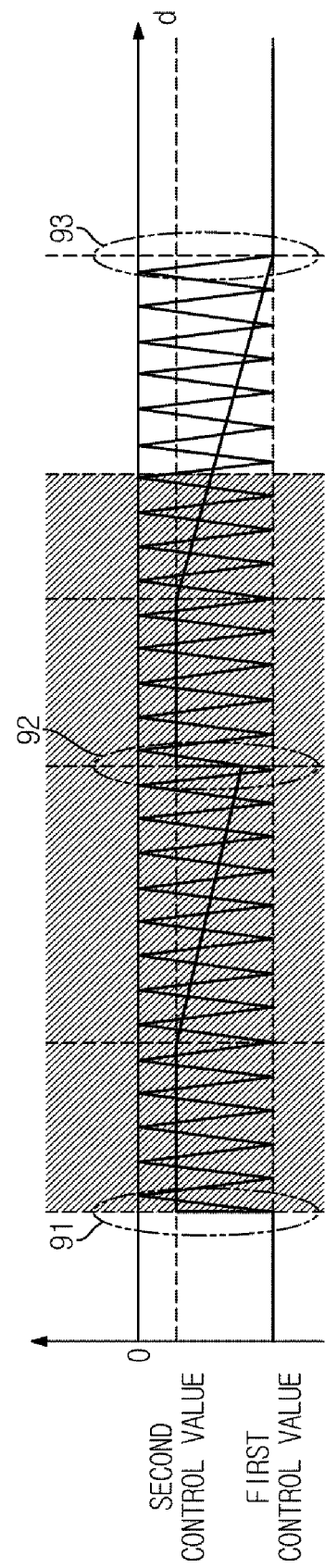
Figure 8C:
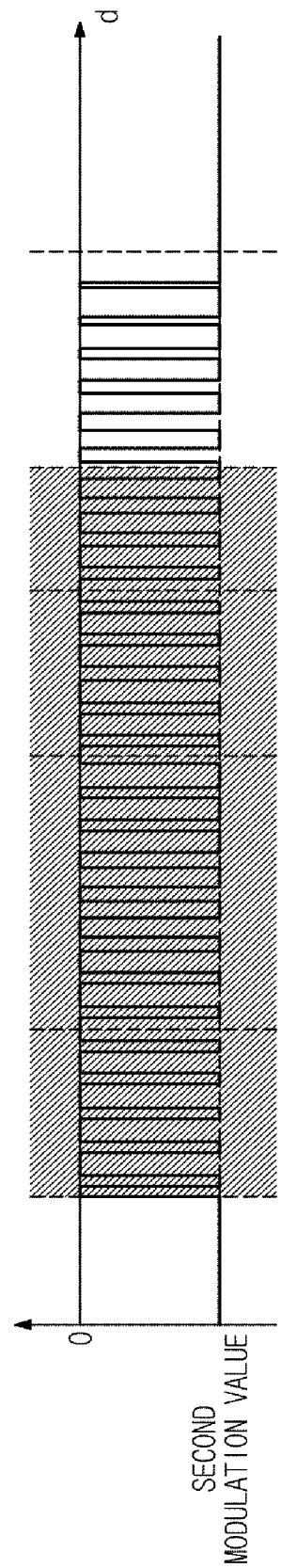

FIGS. 8A-8C are graphs for explaining the safety control according to an embodiment of the present disclosure in detail.

Referring to FIGS. 8A-8C, the X axis represents each control operation of the vehicle 1, and the Y axis represents the distance d. As an example, the wheel slip may occur twice in an interval 90 where the safety control is performed.

In a general coasting control other than the safety control, the vehicle 1 controls the motor 70 with the first control value. Herein, the first control value is determined based on an input command transmitted by the driver through the paddle shifters 20 and 21. If the paddle shifters 20 and 21 are not provided in the vehicle 1, the first control value may be determined as a predetermined value.

When it is determined to perform the safety control in which the wheel slip occurs (91), the vehicle 1 drives the motor 70 based on a control value lower than the first control value, i.e., the second control value. Herein, the second control value lower than the first control value means the magnitude of the torque generated by the motor 70. As described above, since the vehicle 1 that travels at a constant vehicle speed (for example, 10 Km/h) or more generates a torque in the deceleration direction, the sign of the control value is indicated by a minus sign.

When the wheel slip dissipates, the vehicle 1 controls the motor 70 to generate a strong torque while slowly raising the second control value to the first control value.

The slope of the rising change may be determined by the following equation 1.

Change slope=(first control value−second control value)/(set time)  [Equation 1]

Herein, the change slope means the degree of the control value to be increased after the wheel slip dissipates, and the set time is a preset time in the storage 51 or the like.

When the wheel slip occurs again while the torque is increased (92), the vehicle 1 again drives the motor 70 with the second control value. Further, when the wheel slip dissipates, the vehicle 1 raises the second control value.

When a low friction section (90) is released, the vehicle 1 continues to raise the control value to return to the first control value (93).

On the other hand, as described above with reference to FIG. 6, the controller 50 controls the motor 70 through the modulator 60. The modulator 60 performs an inverter control to drive the motor 70.

In one embodiment, the controller 50 calculates the generated control value to a modulation value of the PWM method. The PWM switching method may generate a constant noise in the motor 70 to transmit a warning to the driver that a weaker braking force than normal is generated, and may recognize that the vehicle 1 is currently under the safety control.

With respect to the PWM, the vehicle 1 may calculate the control value to the modulation value through a triangular wave comparison modulation method, as shown in FIG. 8B.

Specifically, a carrier wave of the triangular wave comparison modulation method may be set to a triangular wave having a cycle of 10 Hz. If the control value is larger than the carrier wave, the modulation value may be calculated as 0, and if the control value is smaller than the carrier wave, the modulation value may be calculated to a predetermined magnitude.

In the safety control according to an example, the modulation value calculated by the controller 50 may be the same as the graph of FIG. 8C.

On the other hand, the modulation method is not necessarily limited to the above-described PWM method, and there is no limitation as long as it is a modulation method that generates a magnitude of a torque generated by the motor 70 to a magnitude lower than normal running.

Figure 9:
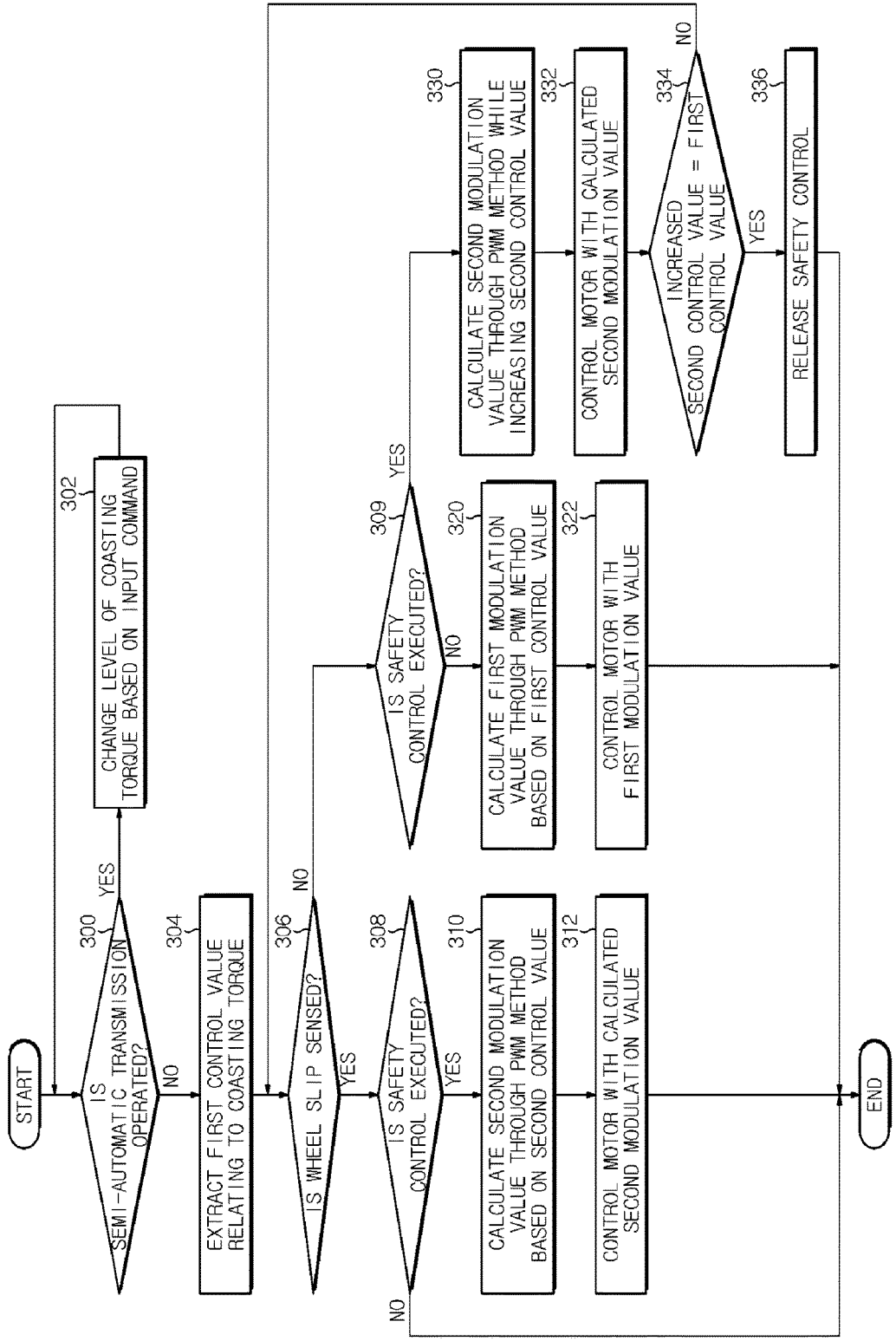
FIG. 9 is a flowchart for explaining a control method according to an embodiment of the present disclosure.

FIG. 9 is a flowchart for explaining a control method according to an embodiment of the present disclosure.

Referring to FIG. 9, the disclosed vehicle 1 receives an input command regarding a semi-automatic transmission operation from a driver (S300).

The input command may be transmitted via the paddle shifters 20 and 21, and is not necessarily limited to a button type shown in FIG. 2.

If the driver's input command is received, the vehicle 1 changes the level of the coasting torque based on the input command (S302).

If there is no change, the vehicle 1 extracts the first control value based on a command set in advance or inputted previously by the driver (S304).

That is, the first control value is a control signal for generating a coasting torque in the coasting control.

The vehicle 1 senses a wheel slip (S306).

The wheel slip may be determined through various methods as well as the speed difference of the wheels 9 as described above.

If a wheel slip is sensed, the vehicle 1 determines whether or not a safety control is executed (S308). The safety control is determined by whether or not the vehicle 1 is on the low friction road surface. The low friction road surface is determined on the basis of the information collected from the sensor 30 or the outside of the vehicle 1.

If the safety control is being executed, the vehicle 1 calculates the second modulation value of the PWM method based on the second control value smaller than the first control value (S310). Further, the vehicle 1 controls the motor 70 based on the calculated second modulation value (S312).

That is, when the wheel slip occurs in the safety control, the vehicle 1 may control the motor 70 to generate a coasting torque of a predetermined magnitude, instead of controlling the motor 70 to generate the coasting torque which has been changed to zero in the prior art.

If the wheel slip does not occur and the vehicle 1 is in a normal running state other than the safety control (S309), the vehicle 1 controls the motor 70 based on the coasting torque based on the input command of the driver, i.e., the first control value. That is, the vehicle 1 calculates a first modulation value based on the first control value (S320), and controls the motor 70 based on the calculated first modulation value (S322).

In a case where the wheel slip does not occur but the safety control is executed, the vehicle 1 calculates a second modulation value through the PWM method while increasing the second control value (S330).

The degree of increase may be continued while executing the safety control, and the increasing slope may be preset or based on the average time that the low friction road surface is released through the communication device 80 or the like.

The vehicle 1 controls the motor 70 by inverting based on the increased second modulation value (S332).

If the increased second control value reaches the first control value (S334), the vehicle 1 releases the safety control (S336). However, if the vehicle 1 is still under the safety control, the vehicle 1 may sense whether or not the wheel slip continuously occurs while increasing the coasting torque (S306).

Accordingly, the vehicle 1 may variably regulate the coasting torque when the wheel slip occurs while running, so that the running stability and the steering stability can be ensured on a road surface with a low friction as compared with the prior art.

On the other hand, at the deceleration using the general brake pedal 22, the kinetic energy of the vehicle 1 is discarded as heat by the brake pads. To solve this problem, the vehicle varies the coasting torque to perform motor regenerative braking and improves the fuel efficiency.

The disclosed vehicle 1 may also perform motor regenerative braking by varying the coasting torque in the safety control that does not use the brake pedal 22, thereby improving the fuel efficiency.

As is apparent from the above, the vehicle and the control method of the vehicle by means for solving the above-mentioned problems can secure the running stability and the steering stability on the road surface with less friction compared to the prior art by variably controlling a coasting torque when a wheel slip occurs during driving.

The vehicle and the control method of the vehicle according to another aspect of the present disclosure can avoid the loss due to the braking of a hydraulic brake, thereby improving the fuel efficiency.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
a plurality of wheels;
a motor for providing a driving force to the plurality of wheels based on electrical energy stored in a battery;
a modulator for controlling a number of rotations of the motor; and
a controller for:
controlling the modulator based on a first control value for controlling the motor to rotate with a first magnitude torque at a coasting control,
when a wheel slip occurs in a safety control, controlling the modulator based on a second control value for controlling the motor to rotate with a second magnitude torque other than zero, and
when the wheel slip dissipates, controlling the modulator so that the motor rotates by gradually raising a magnitude of torque from the second magnitude torque to the first magnitude torque based on a preset time and a difference between the first magnitude torque and the second magnitude torque.

2. The vehicle according to claim 1, wherein the controller calculates a modulation value through a pulse width modulation (PWM) method based on at least one of the first control value or the second control value.

3. The vehicle according to claim 1, wherein the controller controls the modulator with a second modulation value calculated based on the second control value, and then controls the modulator again by increasing the second control value when the wheel slip dissipates.

4. The vehicle according to claim 3, wherein the controller releases the safety control when the increased second control value is equal to the first control value.

5. The vehicle according to claim 3, wherein the controller further decreases the second control value when the wheel slip occurs during the increase of the second control value.

6. The vehicle according to claim 3, wherein the controller increases the second control value based on the preset time.

7. The vehicle according to claim 1, further comprising a paddle shifter for receiving an input command from a driver, wherein the controller determines the first control value based on the input command transmitted by the paddle shifter.

8. The vehicle according to claim 1, wherein the controller determines the wheel slip when a rotational speed difference between front wheels among the plurality of wheels and rear wheels among the plurality of wheels is equal to or more than a reference value.

9. The vehicle according to claim 1, further comprising:
a sensor; and
a communication device for external communication,
wherein the controller determines the safety control based on information on a road surface sensed by the sensor and transmitted from the communication device.

10. A control method of a vehicle, which includes a motor for generating a driving force to wheels based on electrical energy stored in a battery, the control method comprising steps of:
determining, by a controller, a safety control based on a state of a road surface;
controlling, by the controller, the motor based on a first control value for controlling the motor to rotate with a first magnitude torque, at a coasting control;
when a wheel slip occurs in the safety control, controlling, by the controller, the motor based on a second control value for controlling the motor to rotate with a second magnitude torque other than zero; and
when the wheel slip dissipates, controlling, by the controller, the modulator so that the motor rotates by gradually raising a magnitude of torque from the second magnitude torque to the first magnitude torque based on a preset time and a difference between the first magnitude torque and the second magnitude torque.

11. The control method according to claim 10, wherein the step of controlling the motor based on the second control value comprises:
calculating a modulation value through a pulse width modulation (PWM) method based on at least one of the first control value or the second control value; and
controlling a number of rotations of the motor based on the calculated modulation value.

12. The control method according to claim 10, wherein the step of controlling the motor based on the second control value comprises controlling the motor with a second modulation value calculated based on the second control value, and then controlling the motor again by increasing the second control value when the wheel slip dissipates.

13. The control method according to claim 12, wherein the step of controlling the motor based on the second control value comprises: releasing the safety control and executing the coasting control when the increased second control value is equal to the first control value.

14. The control method according to claim 12, wherein the step of controlling the motor based on the second control value comprises decreasing the second control value again when the wheel slip occurs during the increase of the second control value.

15. The control method according to claim 12, wherein the step of controlling the motor based on the second control value comprises increasing the second control value on the preset time.

16. The control method according to claim 10, wherein the vehicle further includes a paddle shifter for receiving an input command from a driver, and
wherein the step of controlling the motor based on the first control value comprises: determining the first control value based on an input command transmitted by the paddle shifter.

17. The control method according to claim 10, further comprising determining the wheel slip when a rotational speed difference between front wheels among the plurality of wheels and rear wheels among the plurality of wheels is equal to or more than a reference value.

18. The control method according to claim 10, wherein the vehicle further includes: a sensor; and a communication device for external communication, and wherein the step of determining the safety control comprises determining the safety control based on the state of the road surface sensed by the sensor and transmitted by the communication device.

* * * * *